US009702500B2

(12) United States Patent
Jarema, III et al.

(10) Patent No.: US 9,702,500 B2
(45) Date of Patent: Jul. 11, 2017

(54) JUKEBOX MOUNT WITH VIDEO DISPLAYS

(71) Applicant: AMI Entertainment Network, LLC, Trevose, PA (US)

(72) Inventors: Stephen Jarema, III, Pittsgrove, NJ (US); Jeffrey J. Kalis, Sparta, MI (US); Michael G. Maas, New Hope, PA (US); Mark Simpson, Rockford, MI (US)

(73) Assignee: AMI ENTERTAINMENT NETWORK, LLC, Trevose, PA (US)

( * ) Notice: Subject to any disclaimer, the term of this patent is extended or adjusted under 35 U.S.C. 154(b) by 435 days.

(21) Appl. No.: 14/553,365

(22) Filed: Nov. 25, 2014

(65) Prior Publication Data

US 2015/0227267 A1 Aug. 13, 2015

Related U.S. Application Data

(60) Provisional application No. 61/937,777, filed on Feb. 10, 2014.

(51) Int. Cl.
*G06F 3/048* (2013.01)
*F16M 11/00* (2006.01)
*G06F 1/18* (2006.01)

(52) U.S. Cl.
CPC ............ *F16M 11/00* (2013.01); *G06F 1/181* (2013.01)

(58) Field of Classification Search
CPC .......... G06F 3/048; G06F 21/00; G06F 17/00; G06F 13/38; G06F 13/12; G06F 1/1605; G06F 3/04842
See application file for complete search history.

(56) References Cited

U.S. PATENT DOCUMENTS

| 5,481,509 | A | 1/1996 | Knowles |
| 7,500,192 | B2 | 3/2009 | Mastronardi |
| 8,099,482 | B2 | 1/2012 | Clark et al. |
| 8,325,571 | B2 | 12/2012 | Cappello et al. |
| 8,473,416 | B2 | 6/2013 | Brillon et al. |
| 8,717,316 | B2 * | 5/2014 | Gothard ................. G06Q 30/02 345/173 |
| D715,276 | S * | 10/2014 | Davis .......................... D14/239 |
| 2002/0188363 | A1 * | 12/2002 | Ashy ..................... G07F 17/305 700/94 |
| 2004/0060884 | A1 * | 4/2004 | Nook .................... A47F 5/0807 211/189 |
| 2004/0243482 | A1 | 12/2004 | Laut |

(Continued)

FOREIGN PATENT DOCUMENTS

AU 2013213728 A1 8/2013

*Primary Examiner* — Rashawn Tillery
(74) *Attorney, Agent, or Firm* — Panitch Schwarze Belisario & Nadel LLP

(57) ABSTRACT

A jukebox for playing music and presenting video to a user includes a housing, a user interface display mounted to the housing, a controller mounted to the housing and being in communication with the user interface display and a video display mountable to the housing. The controller is mounted in a cavity defined by the housing. The video display is in communication with the controller. The controller, the user interface display and the video display are configured to facilitate the user's selection of a song from a plurality of songs stored in the controller and to selectively display a video associated with the selected song on the video display.

20 Claims, 12 Drawing Sheets

(56) References Cited

U.S. PATENT DOCUMENTS

| | | | |
|---|---|---|---|
| 2006/0078272 A1* | 4/2006 | Negoescu | G06Q 20/123 386/230 |
| 2006/0153020 A1* | 7/2006 | Johnson | G07F 17/305 369/30.06 |
| 2006/0154729 A1* | 7/2006 | LeMay | G07F 17/32 463/42 |
| 2007/0101362 A1* | 5/2007 | Spielman | G06F 3/0481 725/37 |
| 2009/0133609 A1* | 5/2009 | Nethken | A47B 21/02 108/50.02 |
| 2009/0209324 A1* | 8/2009 | Graf | G07F 17/32 463/25 |
| 2010/0269042 A1 | 10/2010 | Richards et al. | |
| 2012/0002393 A1* | 1/2012 | Stanek | F16M 11/10 361/825 |
| 2012/0186583 A1* | 7/2012 | Drapes | F16M 11/08 128/203.12 |
| 2013/0190068 A1* | 7/2013 | Burghard | G07F 17/32 463/20 |
| 2014/0013226 A1 | 1/2014 | Nathan et al. | |
| 2014/0160656 A1* | 6/2014 | Morrison | G06F 1/1626 361/679.21 |
| 2014/0187326 A1* | 7/2014 | Layne, IV | A63F 13/2145 463/31 |
| 2014/0329583 A1* | 11/2014 | Little | G07F 17/32 463/25 |
| 2015/0087403 A1* | 3/2015 | Castro | G07F 17/3209 463/25 |

* cited by examiner

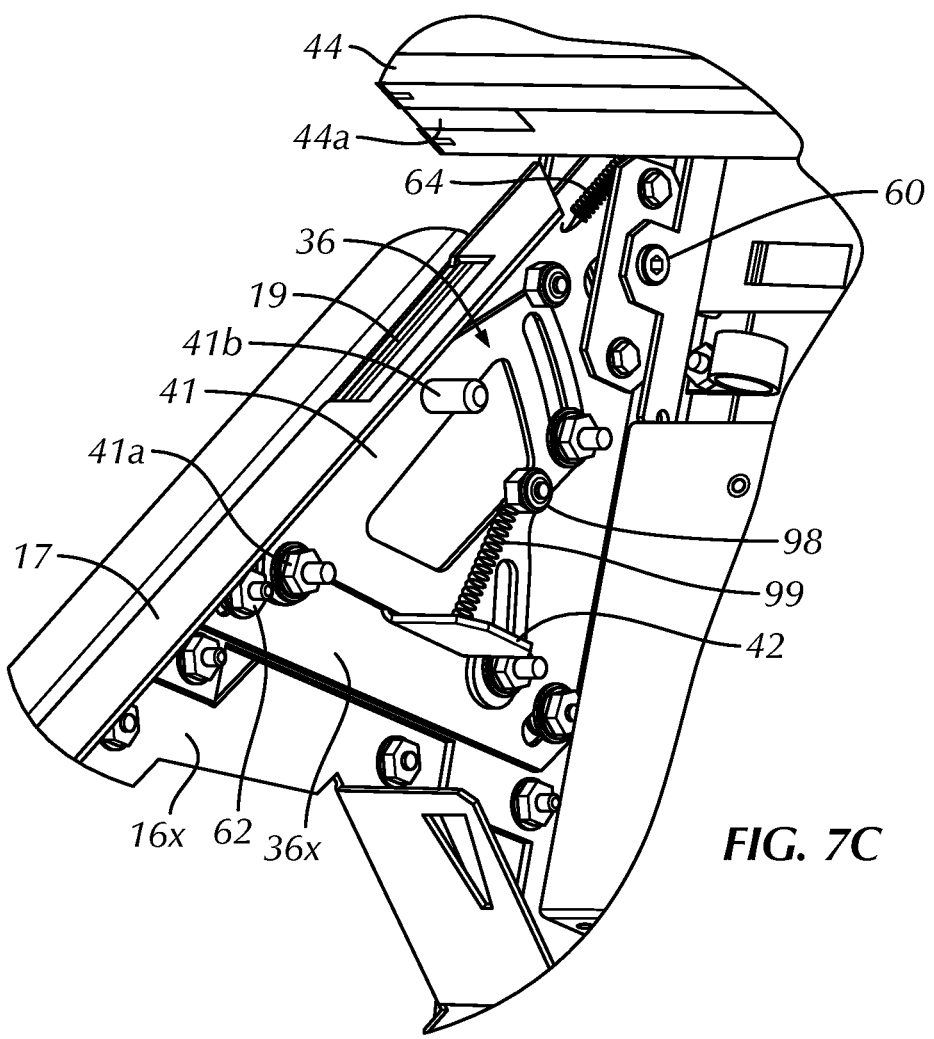

JUKEBOX MOUNT WITH VIDEO DISPLAYS

CROSS-REFERENCE TO RELATED APPLICATIONS

This application claims the benefit of U.S. Provisional Patent Application No. 61/937,777, filed on Feb. 10, 2014, entitled "Jukebox Mount with Video Display," the entire contents of which are incorporated herein by reference in their entirety.

BRIEF SUMMARY OF THE INVENTION

Briefly stated, the preferred present invention is directed to a jukebox for playing music and presenting video to a user. The jukebox includes a housing, a user interface display mounted to the housing, a controller mounted to the housing and being in communication with the user interface display and a video display mountable to the housing. The controller is mounted in a cavity defined by the housing. The video display is in communication with the controller. The controller, the user interface display and the video display are configured to facilitate the user's selection of a song from a plurality of songs stored in the controller and to selectively display a video associated with the selected song on the video display.

In another aspect, the preferred invention is directed to a jukebox for playing music and presenting video to a user. The jukebox includes a housing having an upper portion and a lower portion and a user interface display mounted to the lower portion. The user interface display includes a touchscreen. A controller is mounted to the housing and is in communication with the user interface display. The controller is mounted in a cavity defined by the housing. A display mounting assembly is secured to the upper portion and a graphic panel is movably mounted to the upper portion. A video display is mountable to the upper portion of the housing by the display mounting assembly. The video display is in communication with the controller. The user interface display, the controller and the video display are configured to facilitate the user's selection of a song from a plurality of songs stored in the controller and to selectively display a video associated with the selected song on the video display. The graphic panel is adjustable to accommodate the video display. The graphic panel is movable along a substantially vertical housing axis.

In a further aspect, the preferred invention is directed to a jukebox for playing music and presenting video to a user. The jukebox includes a housing having an upper portion and a lower portion. The lower portion includes a cavity having a mouth and a second locking mechanism mounted within the cavity. A user interface display is mounted to the lower portion such that the user interface display covers the mouth in a closed configuration. The user interface display includes a first lock mechanism on a rear surface facing the cavity that is engageable with the second lock mechanism to lock the user interface display in the closed configuration. The user interface display also includes an upper edge that is pivotable away from the lower portion to an open configuration. The user interface display is slidable relative to the lower portion substantially parallel to the mouth. A controller is mounted to the housing and is in communication with the user interface display. The controller is mounted in the cavity and a video display is mounted to the upper portion. The video display is in communication with the controller. The user interface display, the controller and the video display are configured to facilitate the user's selection of a song from a plurality of songs stored in the controller and to selectively display a video associated with the selected song on the video display.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings:

FIG. 7C is a magnified side perspective view of the second lock mechanism or latch assembly of the lower portion of the jukebox mount of FIG. 7, taken from within circle B of FIG. 7A;

DETAILED DESCRIPTION OF THE INVENTION

Figure 1:
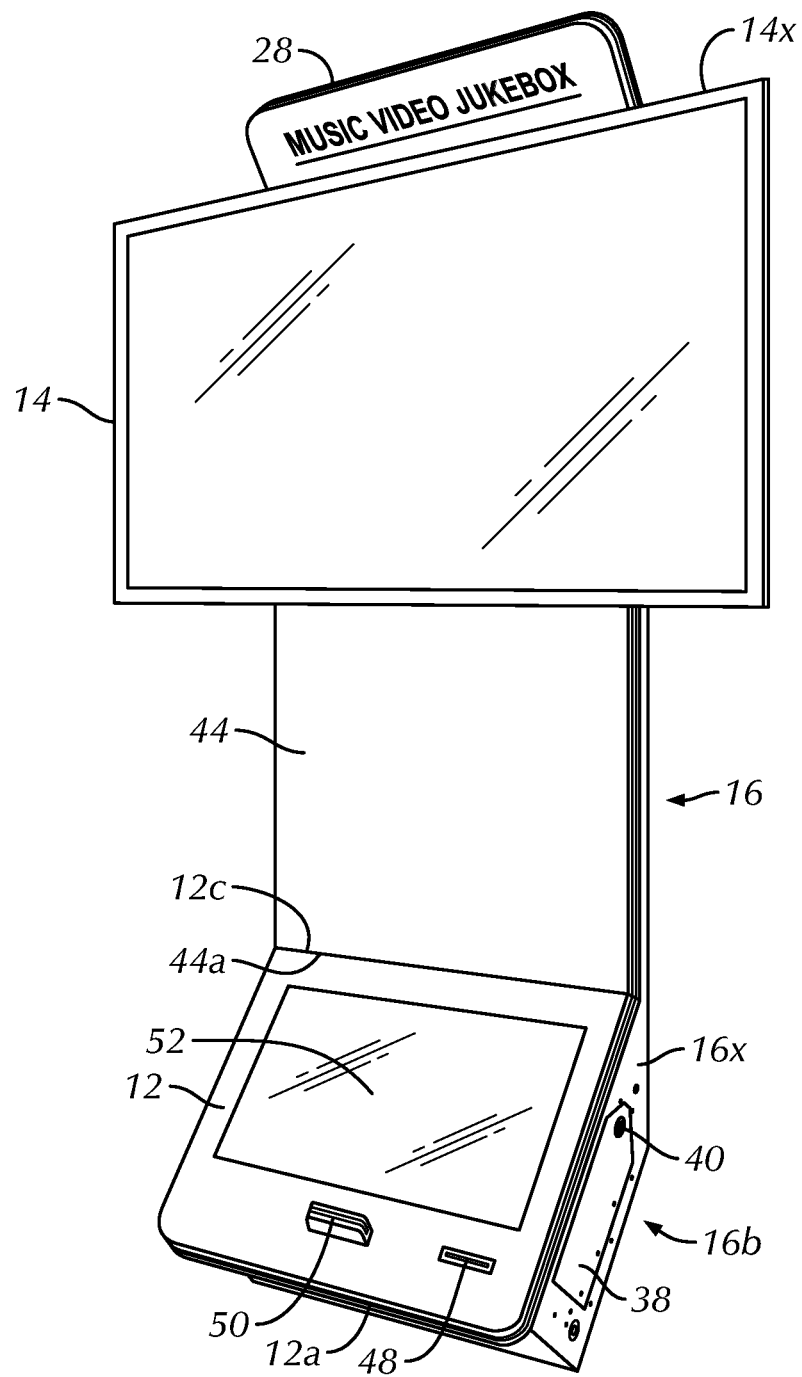
FIG. 1 is a front perspective view of a jukebox mount with multiple displays in accordance with a preferred embodiment of the present invention.
Figure 2:
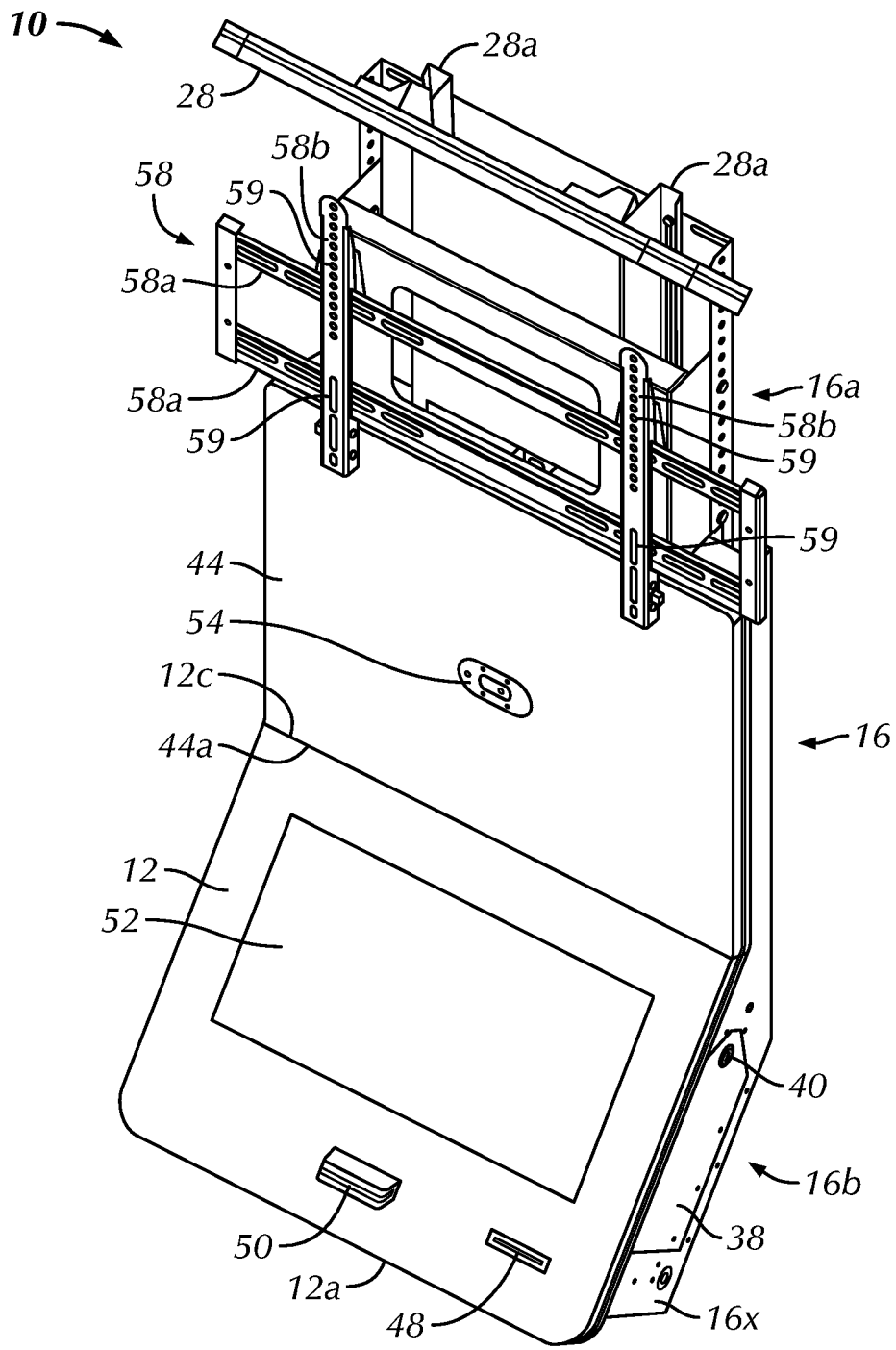
FIG. 2 is a front isometric view of the jukebox mount of FIG. 1 with a video display removed for clarity.
Figure 3:
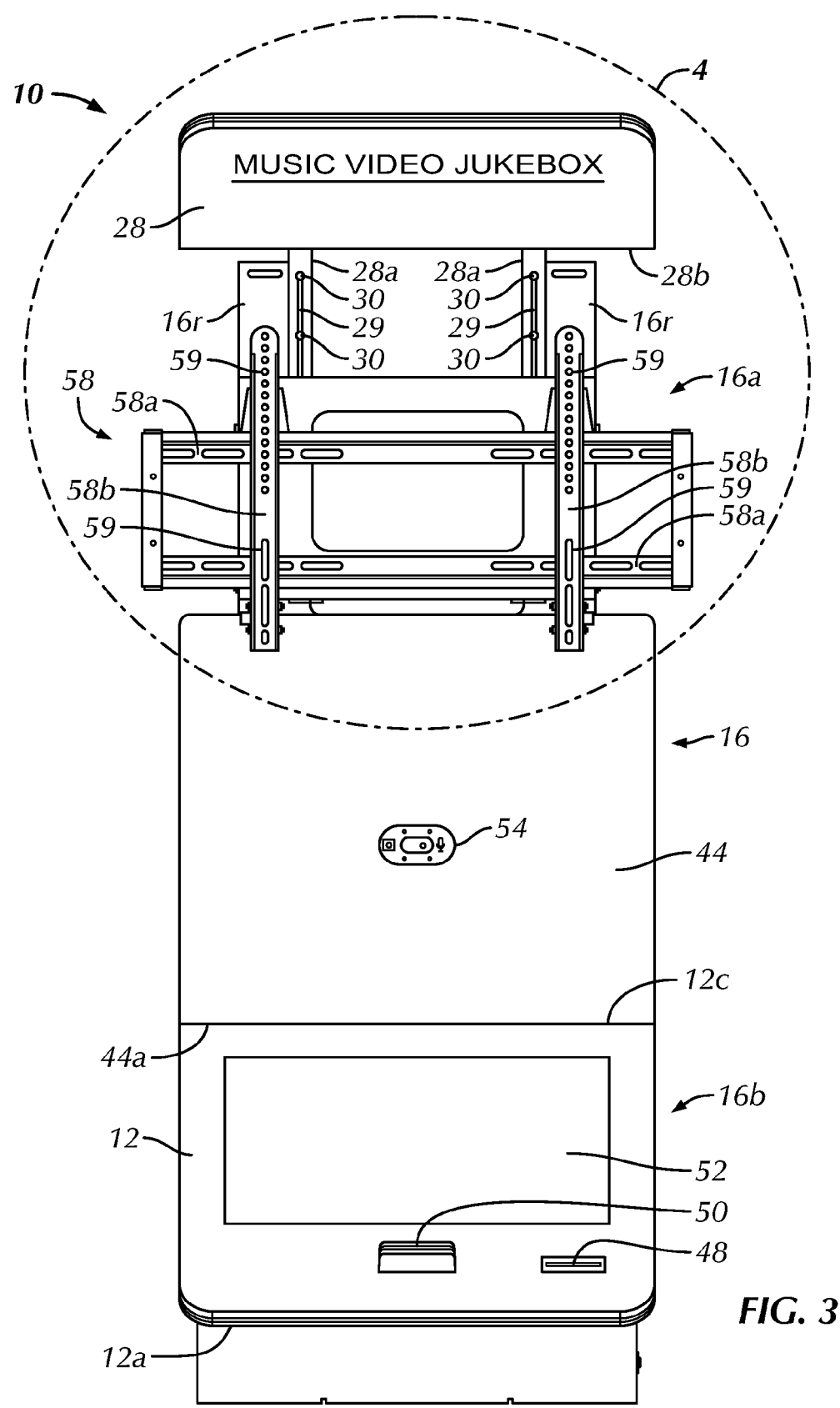
FIG. 3 is a front elevational view of the jukebox mount of FIG. 2.
Figure 4:
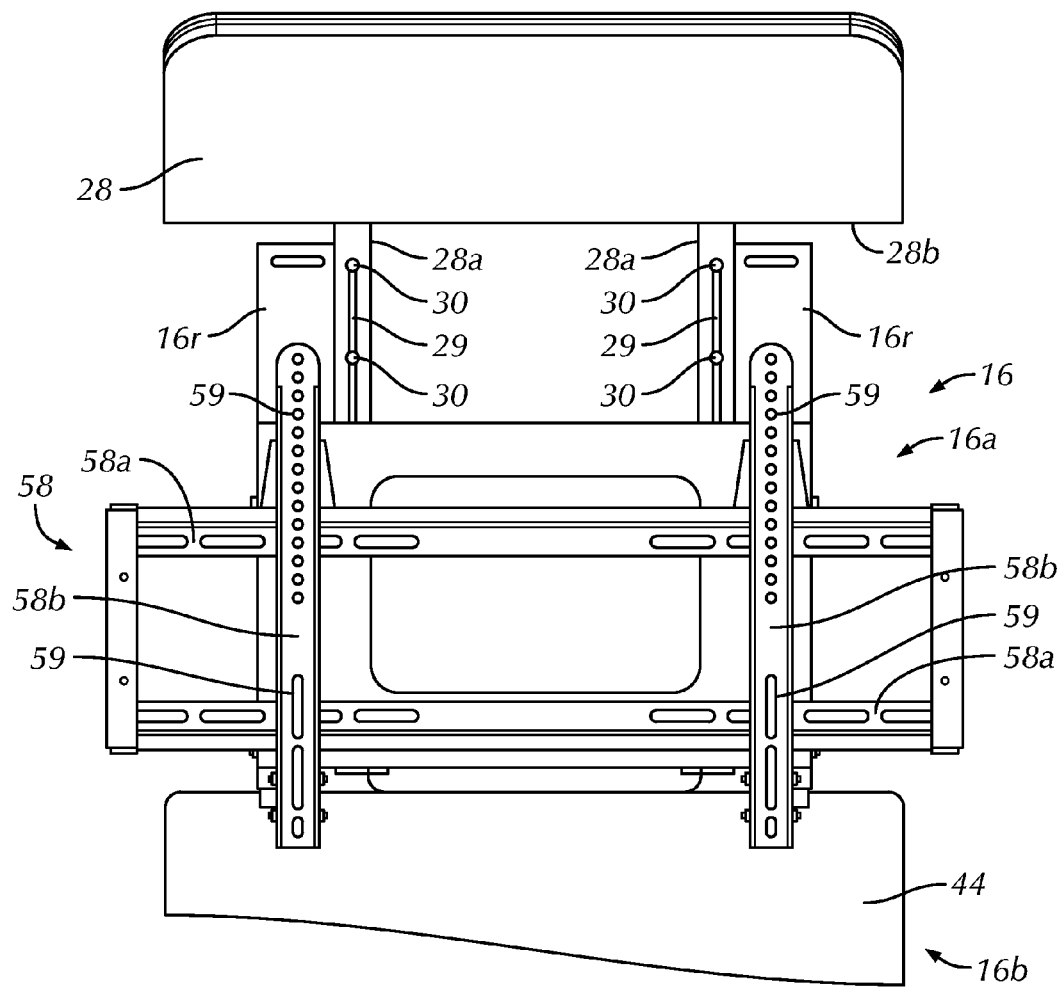
FIG. 4 is a magnified front elevational view of a top portion of the jukebox mount of FIG. 2, taken from within outline 4 of FIG. 3.
Figure 5:
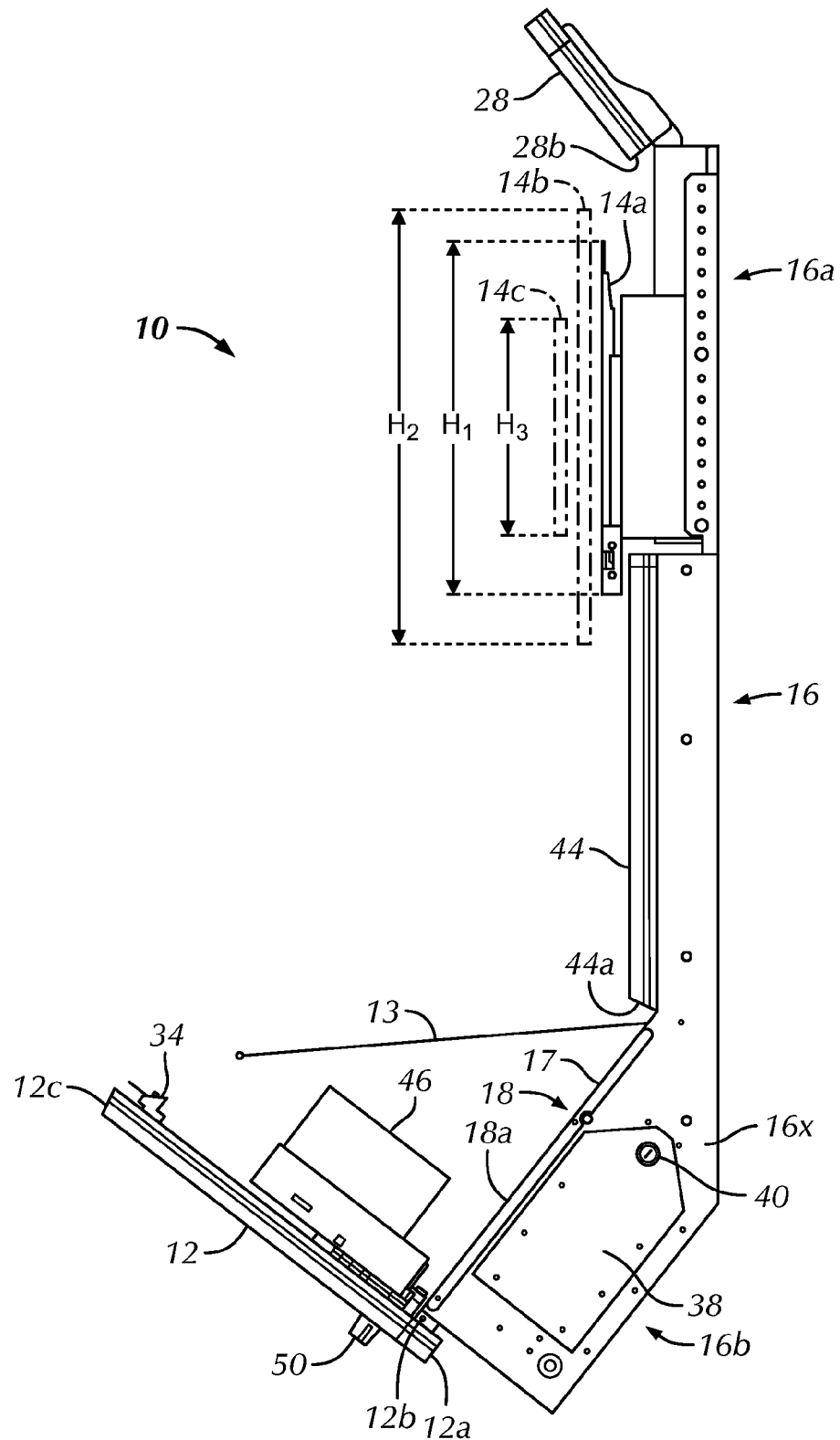
FIG. 5 is a left-side elevational view of the jukebox mount of FIG. 2, wherein a user interface display is positioned in an open configuration and a plurality of video displays are represented in a mounted position to the jukebox mount.
Figure 6:
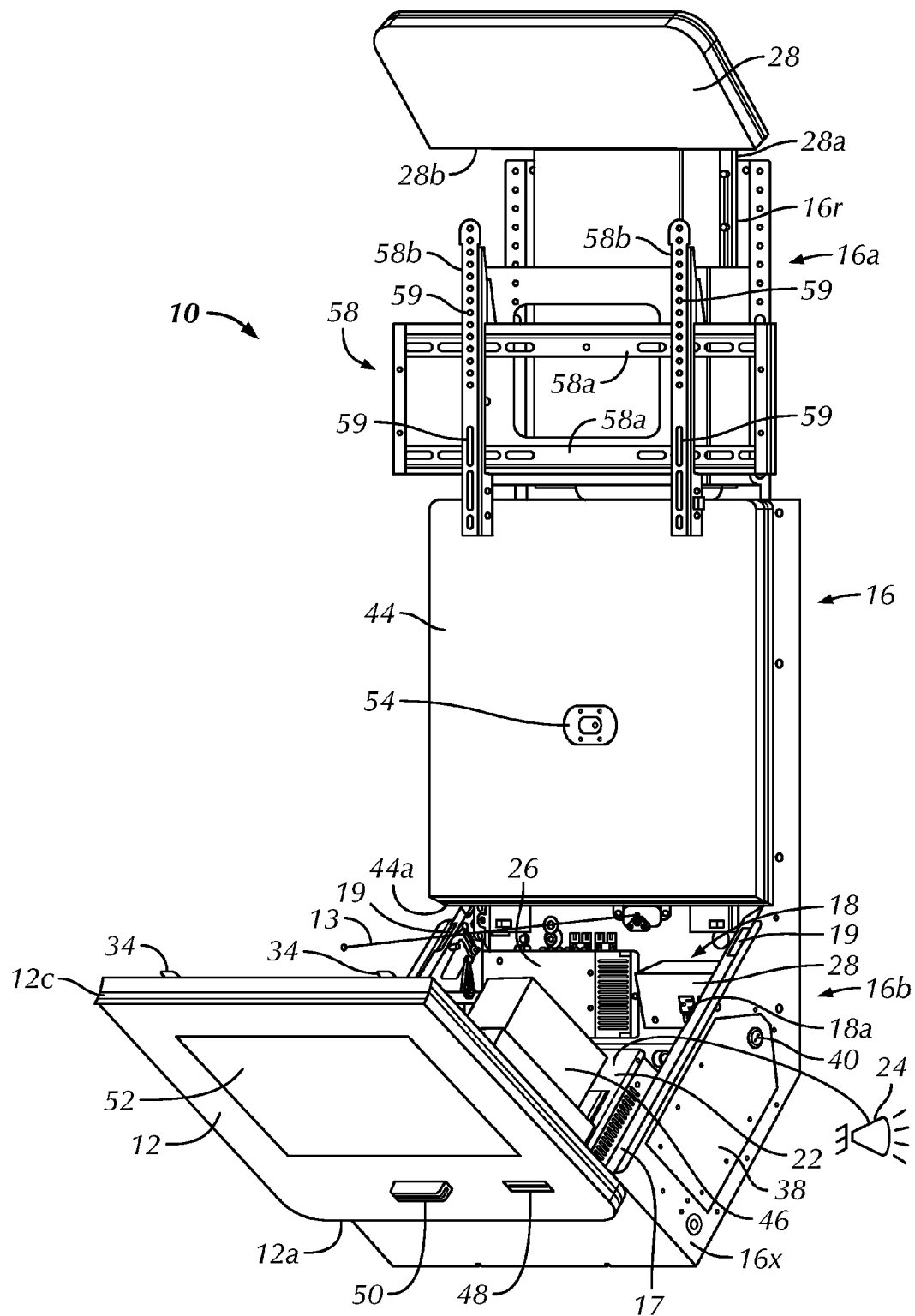
FIG. 6 is a front isometric view of the jukebox mount of FIG. 2, wherein the user interface display is positioned in the open configuration.
Figures 7, 7A:
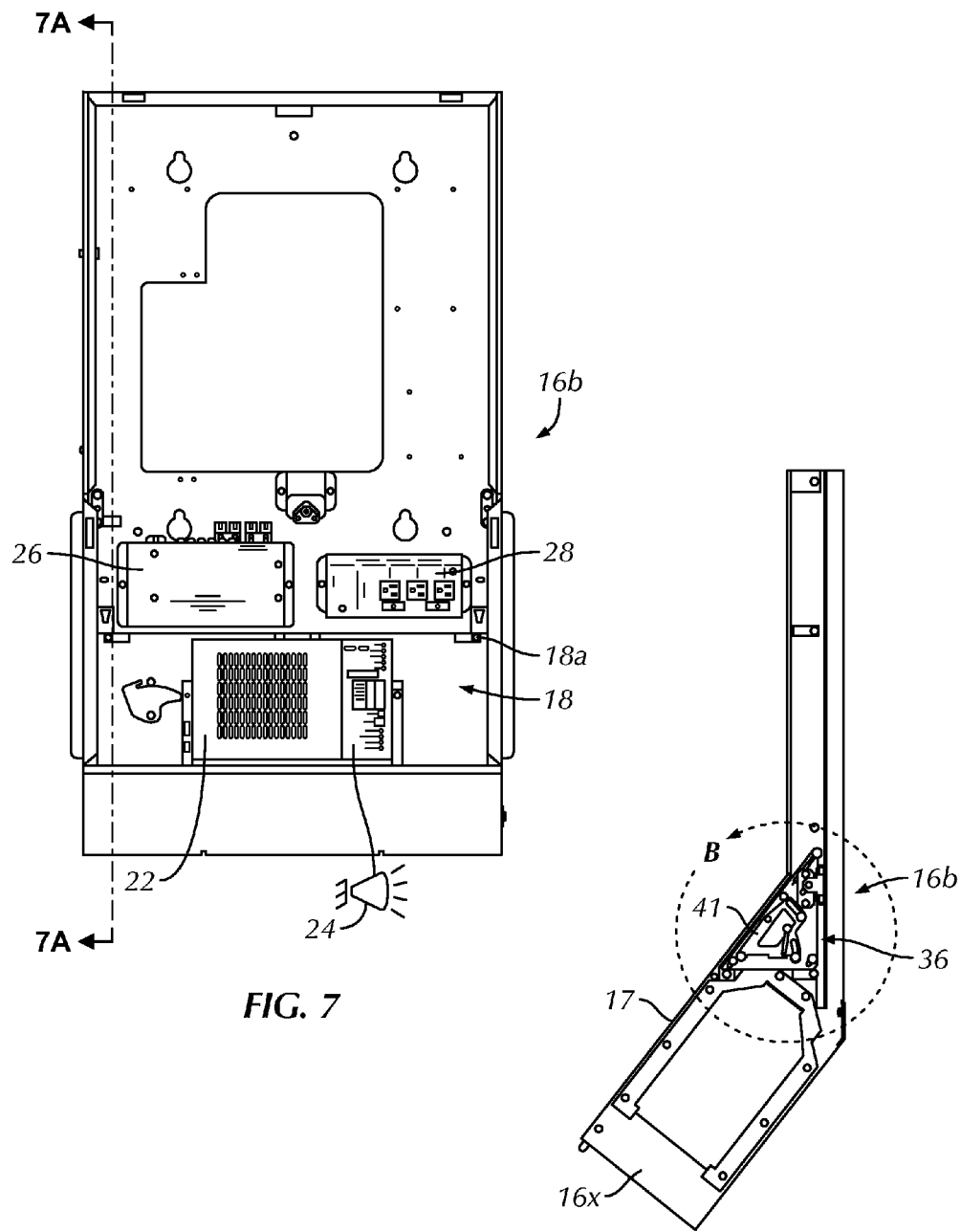
FIG. 7 is a front elevational view of a lower portion of the jukebox mount of FIG. 2, with the user interface display removed for clarity.
FIG. 7A is a cross-sectional view of the lower portion of the jukebox mount of FIG. 7, taken along line 7A-7A of FIG. 7.
Figure 7B:
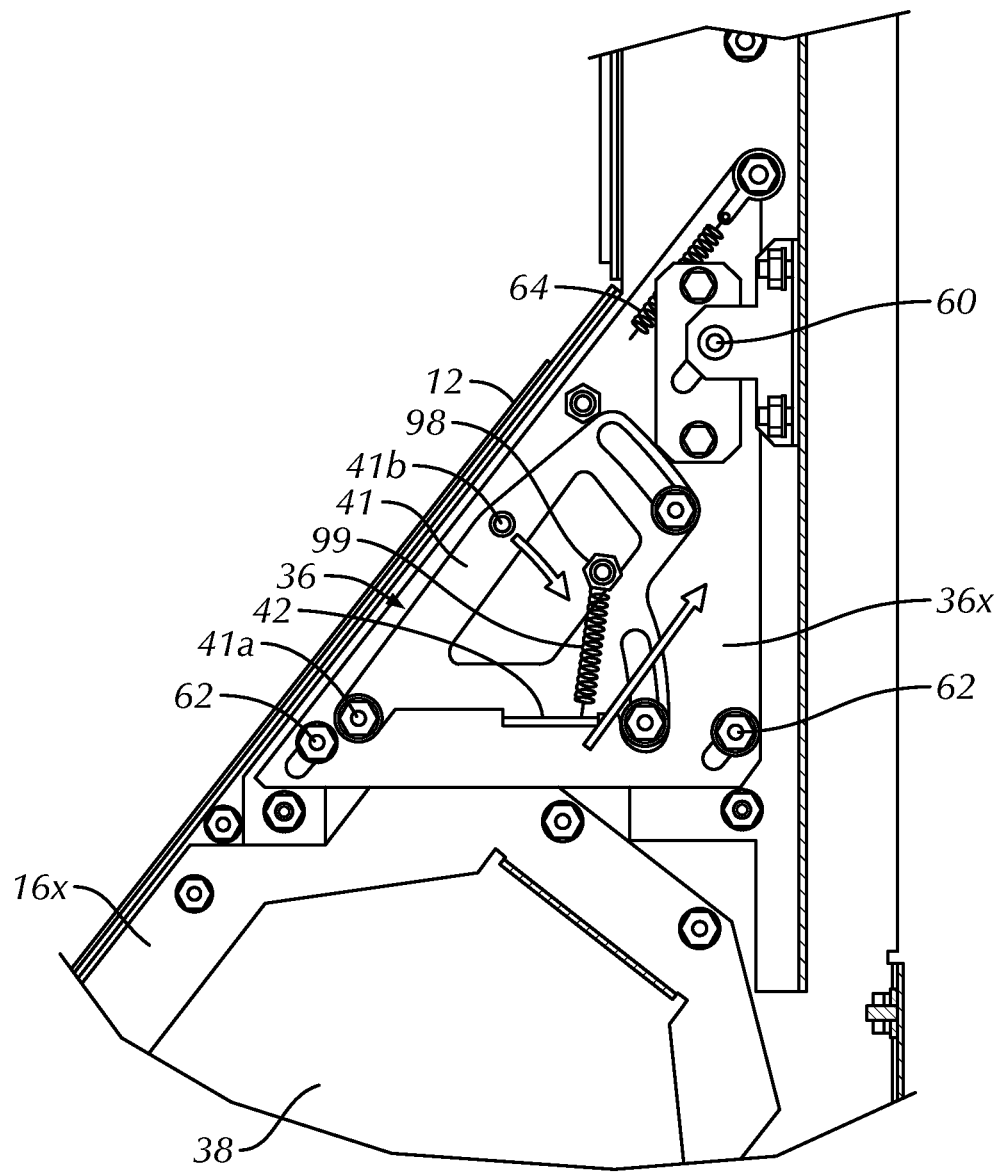
FIG. 7B is a magnified view of a second lock mechanism or a latch assembly of the lower portion of the jukebox mount of FIG. 7, taken from within circle B of FIG. 7A.

Certain terminology is used in the following description for convenience only and is not limiting. Unless specifically set forth herein, the terms "a", "an" and "the" are not limited to one element but instead should be read as meaning "at least one". The words "right," "left," "lower," and "upper" designate directions in the drawings to which reference is made. The words "inwardly" or "distally" and "outwardly" or "proximally" refer to directions toward and away from, respectively, the geometric center or orientation of the device and related parts thereof. The terminology includes the above-listed words, derivatives thereof and words of similar import.

Referring to FIGS. 1-13, in a preferred embodiment, the present invention is directed to a jukebox and jukebox mount, generally designated 10, with multiple displays, preferably including a user interface display 12 and a video display 14, for playing music and presenting video to a user. The preferred jukebox or jukebox mount 10 includes a housing 16 having an upper portion 16a and a lower portion 16b. The housing 16 preferably provides for wall-mounting of the jukebox 10 and is configured as a substantially strong, rigid construct to facilitate mounting of the jukebox 10 to the wall. The lower portion 16b of the housing 16 preferably defines a cavity 18. The cavity 18 preferably houses various components of the jukebox 10, as will be described in greater detail below, and has a mouth 18a to provide access to the cavity 18 and the components therein.

The user interface display 20 is preferably mounted to the housing 16 and, specifically, to the lower portion 16b in the preferred embodiment. The user interface display 20 is preferably pivotably mounted to the lower portion 16b and is pivotable between an open configuration (FIGS. 5 and 6), wherein the mouth 18a is exposed and a closed configuration (FIGS. 1 and 2), wherein the user interface display 12 substantially covers the mouth 18a and closes the cavity 18. The user interface display 12 is not limited to being pivotably mounted to the lower portion 16b and may be fixed to the housing 16, may be slidably mounted to the housing 16, may be pivotably and slidably mounted to the housing 16, may be detached or detachable from the housing 16 or may be otherwise arranged relative to the housing 16.

A controller 22 is preferably mounted to the housing 16 and is in communication with the user interface display 12. The controller 22 is mounted in the cavity 18 defined by the housing 16 and by the lower portion 16a in the preferred embodiment, but is not so limited. The controller 22 may be mounted in other locations to the housing 16, may be secured remotely from the housing 16 or may be otherwise mounted such that the controller 22 is in communication with the user interface display 12. The controller 22 preferably includes a plurality of songs stored therein and a plurality of videos. The controller 22 is preferably able to send signals to the jukebox 10 to present the plurality of songs and the plurality of videos to the user for the selection of songs and/or videos for play. The plurality of songs may be associated with certain of the plurality of videos for concurrent performance of the song and associated video, but the performance and operation of the controller 22 are not so limited and the controller 22 may be configured to play only audio of one of the songs, only video of one of the videos, randomly play songs and videos from the plurality of videos or otherwise configured to play the stored songs and/or videos.

A speaker 24 is in communication with the controller 22 to play the audio of the jukebox 10. The speaker 24 may be mounted to the housing 16, remotely relatively to the housing 16 or otherwise mounted in order to play the audio from the songs and/or video.

The video display 14 is preferably mountable to the housing 16 and, specifically, the video display 14 is preferably mounted to the upper housing 16a. The video display 14 is in communication with the controller 22 such that the controller 22 is able to send a signal to the video display 14 to show the videos of the plurality of videos. The controller 22, the user interface display 12 and the video display 14 are configured to facilitate the user's selection of a selected song from the plurality of songs stored in the controller 22 and to selectively display video associated with the selected song on the video display 14.

An amplifier assembly 26 and a power distribution assembly 29 are preferably mounted in the cavity 18 and are in communication with the controller 22. The amplifier 26 and the power distribution assembly 29 facilitate song and video performance of the jukebox 10.

In the preferred embodiment, a graphic panel 28 is movably mounted to the housing 16 and, specifically, the graphic panel 28 is mounted to the upper housing 16a. The graphic panel 28 is preferably in communication with the controller 22 and has attraction features, such as light emitting diodes ("LED"), video capabilities or other attraction features to attract attention of the users to the jukebox 10. The graphic panel 28 is not limited to including attraction features and may be comprised of a static display or may also include or be comprised of the speaker 24. In addition, the jukebox 10 of the preferred embodiment is not limited to inclusion of the graphic panel 28 and may be configured without the graphic panel 28, without significantly impacting the design and function of the preferred jukebox 10. The graphic panel 28 is preferably movably mounted to the housing 16 by a pair of panel mounting rails 28a with slots 29 that cooperate with housing rails 16r of the upper housing 16a. Fasteners 30 are selectively securable in the slots 29 to secure the graphic panel 28 to the upper housing 16a and at various positions relative to the housing 16 to accommodate various sized video displays 14, as will be described in greater detail below.

In the preferred embodiment, the video display 14 may comprising a plurality of video displays 14, such as a first video display 14a having a first height $H_1$, a second video display 14b having a second height $H_2$ and a third video display 14c having a third height $H_3$. The graphic panel 28 is preferably movable relative to the housing 16 to accommodate the first, second and third heights $H_1$, $H_2$, $H_3$ of the first, second and third video displays 14a, 14b, 14c, respectively. The graphic panel 28 is preferably movable, substantially vertically relative to the housing 16 to facilitate a clean and relatively seamless appearance as the sizes of the video displays 14, 14b, 14c that are mounted to the housing 16 are modified. The graphic panel 28 is preferably positioned such that a lower edge 28b of the graphic panel 28 is positioned approximately one inch (1") below a top edge 14x of the video display 14 in the mounted configuration. The lower edge 28b is not limited to being positioned one inch (1") below the top edge 14a, but this approximate relative position is preferred to provide a substantially smooth and continuous visual appearance of the graphic panel 28 relative to the video display 14. The plurality of video displays 14a, 14b, 14 are not limited to only three (3) video displays 14a, 14b, 14c having three sizes and may be comprised of nearly any size, which can preferably be accommodated by the adjustable graphic panel 28. The preferred jukebox 10 is able to accommodate televisions or displays having diagonal dimensions of twenty-six to seventy inches (26-70"), more preferably thirty-two to sixty inches (32-60"), but is not so limited. The jukebox 10 may accommodate televisions or displays 14 having nearly any size and/or dimensions desired by the user.

The jukebox 10 is also not limited to including a single video display 14 mounted to the housing 16 in the mounted configuration. Specifically, at least two video displays 14 may be mounted to the housing 16 one on top of the other and the upper portion 16a is preferably configured for mounting the two vertically disposed video displays 14. In addition, the graphic panel 28 is preferably configured to accommodate positioning relative to the two vertically mounted video displays 14. In addition, the upper portion 16*a* is preferably configured for horizontal or side-by-side mounting of at least two video displays 14 adjacent to each other in the mounted configuration. Further, the upper portion 16*a* may be configured for mounting of the video display 14 or multiple video displays that are pivotable about a vertical axis, pivotable about a horizontal axis and/or may extend outwardly from the upper portion 16*a* on a movable mount such that the video display 14 may be oriented for user preferences.

Figure 8:
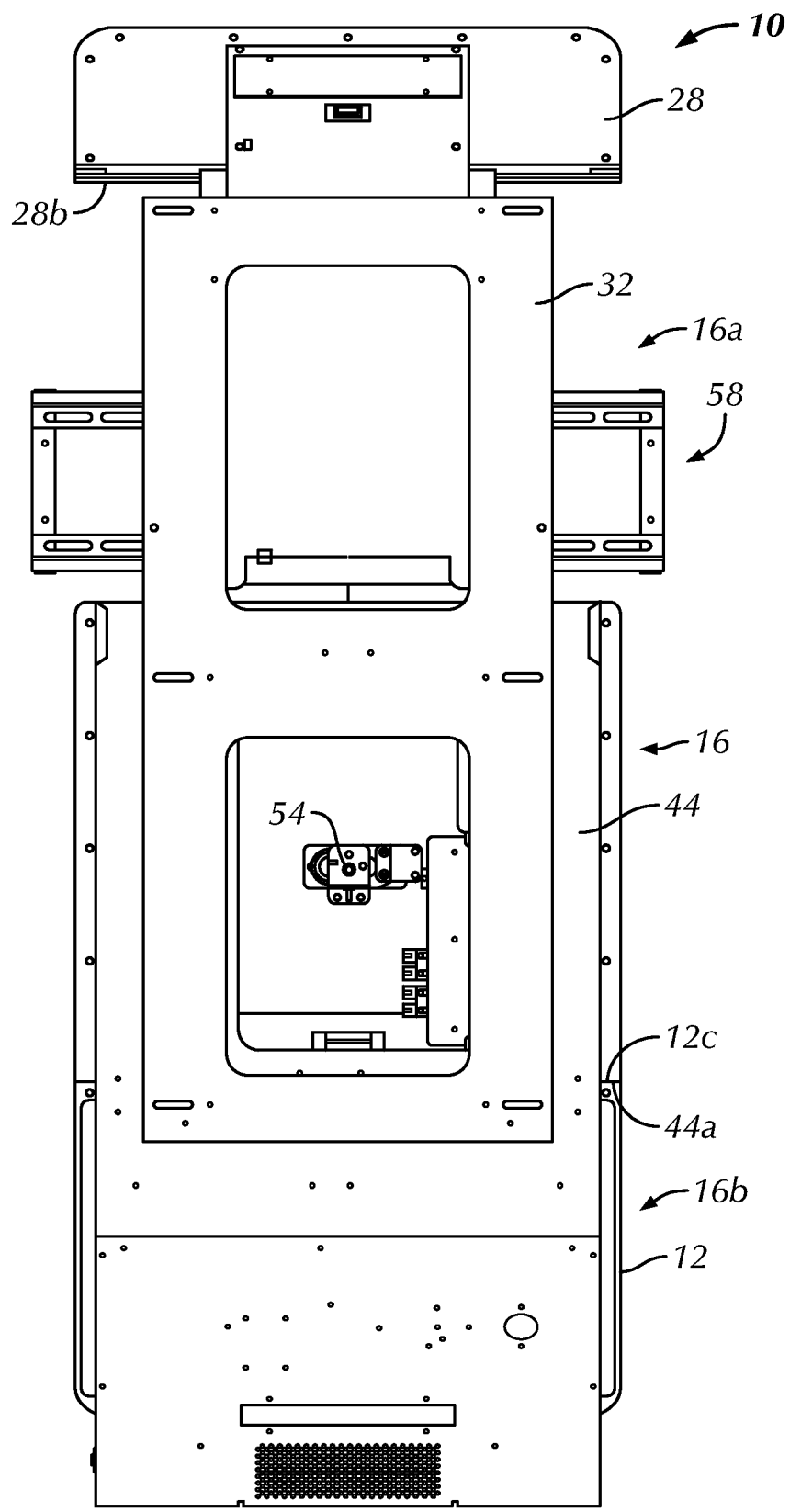
FIG. 8 is a rear elevational view of the jukebox mount of FIG. 2.
Figure 9:
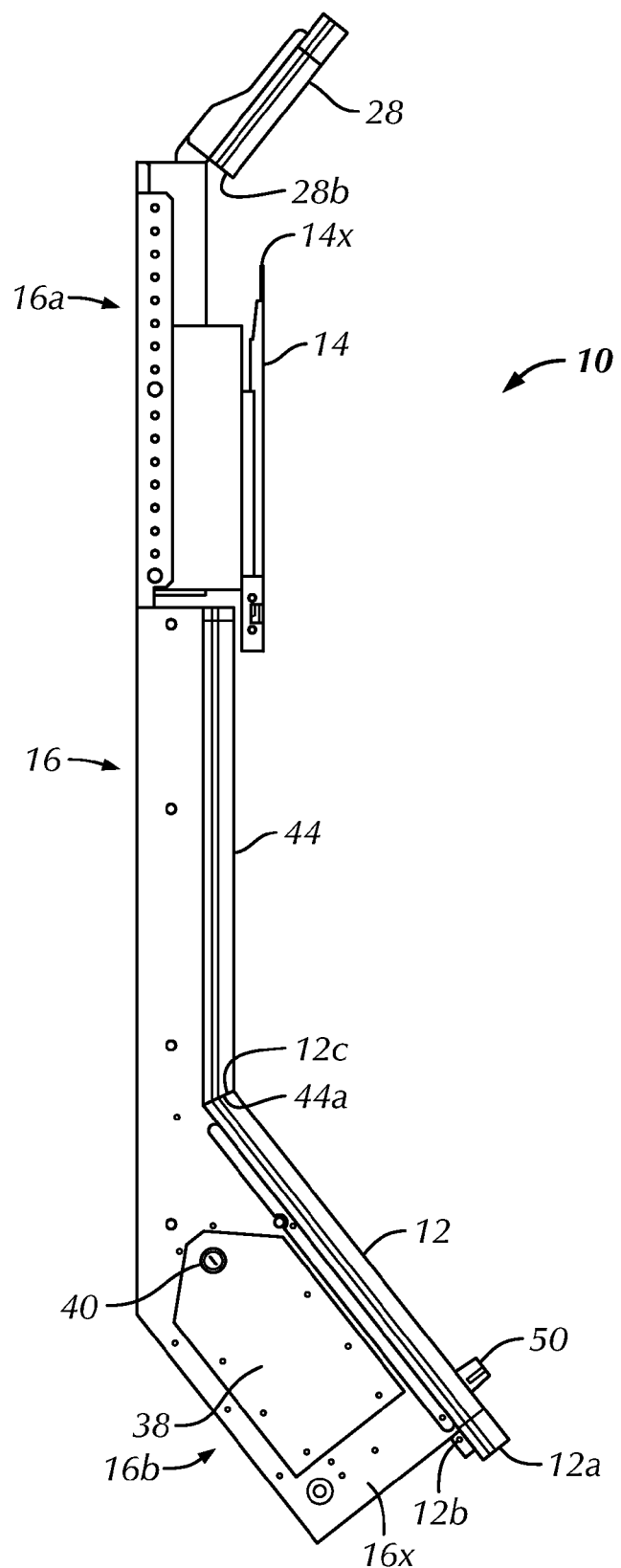
FIG. 9 is a right-side elevational view of the jukebox mount of FIG. 2 with the video display mounted thereon.
Figure 10:
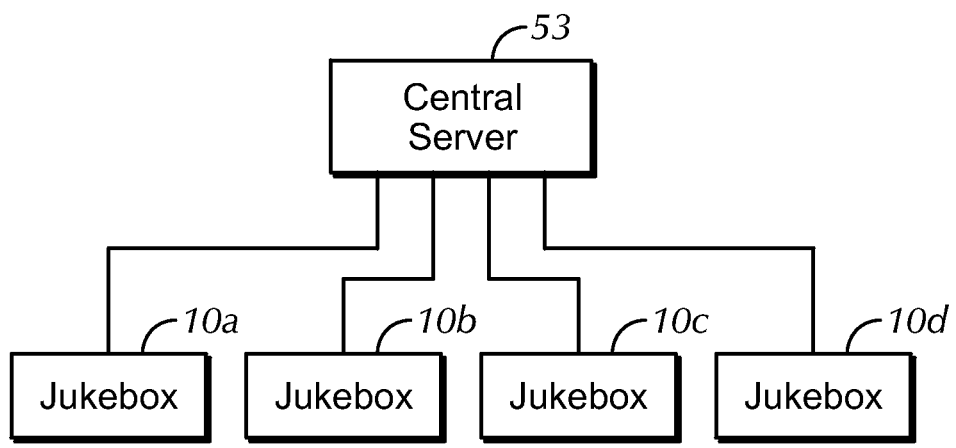
FIG. 10 is a block diagram of a plurality of the preferred jukeboxes and jukebox mounts of FIG. 2 in communication with a central server.

Referring to FIG. 8, the jukebox 10 is preferably mounted to a wall, but is not so limited, by a wall mount bracket 32. The wall mount bracket 32 is preferably sized and configured to mount to studs in a room of a wall, but is not so limited and may be mounted to nearly any variety of wall, such as a concrete, cinderblock or other variety of wall. In addition, the jukebox 10 is not limited to being mounted on a wall and may be floor mounted, movable or otherwise arranged, as would be understood by one having ordinary skill in the art.

Referring to FIGS. 1-8, in the preferred embodiment, the jukebox 10 is mounted to the wall such that the user interface display 12 is positioned at a height that is relatively easy for a user to touch and engage to control the jukebox 10. In addition, the jukebox 10 is preferably mounted such that the graphic panel 28 is positioned approximately at least four to eight inches (4-8") from a ceiling of the room in the mounted configuration. Positioning of the graphic panel 28 relatively close to the ceiling of the room results in the graphic display panel 28 and the video display 14 being relatively close to the ceiling and generally at a height that facilitates viewing by a significant number of users or patrons in the venue. The jukebox 10 is not limited to such wall mountings and may be otherwise mounted relative to the ceiling and/or floor of the venue, depending upon user preferences and the unique dimensions of the wall and/or room.

Referring to FIGS. 5-7C, in the preferred embodiment, the jukebox 10 has a first locking mechanism 34 mounted to the user interface display 12 and a second locking mechanism 36 mounted to the housing 16 within the cavity 18. The first locking mechanism 34 is preferably comprised of a pair of hook elements 34 mounted to the rear face of the user interface display 12 and the second locking mechanism 36 is preferably comprised of a pair of latch assemblies 36 mounted to the lower portion 16*b* of the housing 16 within the cavity 18. In the preferred embodiment, the two hook elements 34 extend into the cavity 18 through hook slots 19 in upper rails 17 of the lower portion 16*b* that partially define the mouth 18*a* of the cavity 18. The lower portion 16*b* preferably includes two cash doors 38 mounted on either side of the lower portion 16*b* that are selectively removable and replaceable to provide access to the cavity 18. The cash doors 38 are preferably lockable using a lock 40 to secure the cash doors 28 to the lower portion 16*b* and may be released and removed from the lower portion 16*b* by unlocking the lock 40.

To access the pair of latch assemblies 36, the locks 40 are unlocked and the cash doors 38 are removed from the lower portion 16*b*. Latch release tabs 42 that extend generally perpendicularly from latch plates 41 of the latch assemblies 36 are engaged and pulled downwardly to release the pair of hook elements 34. The latch plates 41 are pivotably mounted to sidewalls 16*x* of the lower portion 16*a* at a latch pivot pin 41*a*. Pivoting of the latch plates 41 about the latch pivot pins 41*a* causes lock pins 41*b* to disengage from the hook elements 34, thereby allowing the user interface display 12 relative to the lower portion 16*b*. The latch plates 41 are biased to an engaged position by a latch plate spring 99 that extends between an anchor bolt 98 attached to the sidewalls 16*x* and the latch release tabs 42. When the latch release tabs 42 are released by the user, the latch release tabs 42 spring back to the engaged position under the urging of the latch plate spring 99.

Once the user interface display 12 slide downwardly relative to the mouth 18 along the upper rails 17 and is at least slightly pivoted such that the hook elements 34 move out of the hook slots 19, the user interface display 12 may then be moved from the closed configuration to the open configuration. During the initial movement, the user interface display 12 slides downwardly away from the housing 16 and then is pivoted along or proximate it's bottom edge 12*a* at a pivot axis 12*b*. The user interface display 12 is preferably slidable away from the housing 16 such that an upper edge 12*c* of the user interface display 12 clears a front panel display 44 of the housing 16 to permit the user interface display 12 to pivot relative to the housing 16 from the closed configuration to the open configuration. The user interface display 12 is not limited to being slidable and pivotable relative to the housing 16 and may be only pivotable, only slidable or may be otherwise movable relative to the housing 16 to permit a user or operator to access the cavity 18. The user interface display 12 may be moved from the open configuration to the closed configuration, by pivoting the user interface display 12 to rest on the mouth 18 and the lower portion 16*c* and sliding the user interface display 12 toward the housing 16 until the upper edge 12*c* is positioned under an inferior edge 44*a* of the front panel display 44. Arranging the upper edge 12*c* beneath the inferior edge 44*a* in the closed configuration provides a relatively smooth, clean appearance for the jukebox 10, particularly at the joint between the user interface display 12 and the front panel 44, which is visually appealing to users. In the closed position, the hook elements 34 extend through the hook slots and engage the lock pins 41*b* to lock the user interface display 12 in the closed configuration. Accordingly, a user is generally unable to access the cavity 18 without the ability to unlock the locks 40 and is generally unable to access significant components within the cavity without understanding the operation of the latch assemblies 36.

The latch assemblies 36 are also preferably adjustable to accommodate proper positioning of the user interface display 12 relative to the front panel 44. The user interface display 12 is preferably positioned in the open configuration, with a stopper rope 13 holding the user interface display 12 in the open position. Latch adjustment cap screws 60 on both of the latch assemblies 36 are loosened, wherein access to the latch adjustment cap screws 60 is through small holes on either side of the housing 16 and latch adjustment lock nuts 62 on both latch assemblies 36 inside the housing 16 are also loosened. In this preferred embodiment, the latch assemblies 36 include a latch assembly plate 36*x* that is movably attached to the sidewalls 16*x* of the lower portion 16. One at a time, the latch assemblies 36 are moved toward the front of the jukebox 10 to the end of its travel and the cap screws 60 are tightened just enough to hold the latch assemblies 36. The adjustment lock nuts 62 are not immediately tightened and the user interface display 12 is closed and pushed toward the housing 16 until it is in position fully seated and relatively square against the front panel 44. The user interface display 12 is held in the closed configuration and the two cap screws 60 are loosened and the latch assemblies 36 are pulled into position by tension springs 64. The cap screws 60 are retightened, the user interface display 12 is moved to the open configuration and the latch adjustment lock nuts 62 are tightened. The user interface display 12 is opened and closed several times to ensure the user interface display 12 is able to move fully to the closed configuration and is secure. The cap screws 60 and latch adjustment lock nuts 62 are double-checked for tightening and the user interface display 12 is preferably moved and locked in the closed configuration for use.

Referring to FIGS. 1-6, in the preferred embodiment, a bill acceptor 46 is mounted to a rear of the user interface display 12 and is associated with a bill input element 48 on a front face of the user interface display 12. The bill input element 48 preferably accepts bills or cash from users to obtain credits for playing the jukebox 10 and the bill acceptor 46 receives and stores the bills, which may be retrieved by the operator by gaining access to the bill acceptor 46 through the cash doors 38. The user interface display 12 also preferably includes a credit reader 50 mounted to its front face to facilitate the purchase of credits to operate the jukebox 10 using credit and/or debit cards. The jukebox 10 is not limited to inclusion of the bill acceptor 46 or the credit reader 50 and may include nearly any elements or features to accept payment for usage of the jukebox 10, such as wireless communication associated with the controller 22.

The user interface display 12 also preferably includes a touchscreen 52 comprising a portion of the front face of the user interface display 12. The touchscreen 52 is preferably able to display listings of songs and videos for performance by the jukebox 10. The touchscreen 52 is preferably in communication with the controller 22 such that touches of the touchscreen 52 result in signals being sent to the controller 22. The controller 22 may also control the touchscreen 52 to display videos of the plurality of videos, display video to attract users to the jukebox 10 or otherwise to provide visible cues to the users. The controller 22 preferably includes a hard drive to facilitate calculations and controls associated with the controller 22.

Referring to FIGS. 2-8 and 13, the preferred jukebox 10 also includes a camera assembly 54 mounted to the front panel 44 that is in communication with the controller 22. The camera assembly 54 preferable is able to take photographs and/or videos proximate a front of the jukebox 10 as the plurality of songs and/or videos are being performed or played on the jukebox 10. The jukebox 10 may also be configured as part of a network of jukeboxes 10a, 10b, 10c, 10d that are each in communication with the other jukeboxes 10a, 10b, 10c, 10d through a central server 56. Accordingly, the controller 22 is able to communicate with the central server 56 and prompt any one of the plurality of jukeboxes 10a, 10b, 10c, 10d to play one of the plurality of songs, play one of the plurality of jukeboxes, show video from one of the preferred camera assemblies 56, either live or previously recorded or otherwise control the plurality of jukeboxes 10a, 10b, 10c, 10d to create interactive communications between users in various venues of the network. The camera assembly 56 may also include a microphone that permits recording and replay of audio from any of the plurality of jukeboxes 10a, 10b, 10c, 10d in the network. The preferred jukebox 10 is not limited to including the camera assembly 54 or to being part of a network in communication with the central server 56, but these features are preferred.

Referring to FIGS. 2-6, the upper portion 16a preferably includes a video display mounting assembly 58. The video display mounting assembly 58 preferably includes at least horizontal brackets 58a and vertical brackets 58b for mounting the video display 14 to the housing 16. The video display mounting assembly 58 is preferably sized and configured to facilitate mounting of variously sized video displays 14 to the housing 16 depending upon user preferences. The vertical brackets 58b preferably include a plurality of vertical mounting holes or slots 59 therein that facilitate mounting of the various sized video display 14.

Referring to FIGS. 1-13, when the jukebox 10, including the controller 22, is powered and the network connections have been completed, the jukebox 10 preferably, automatically boots up. The user interface display 12 and video display 14 are powered and a high-definition multimedia interface ("HDMI") cable is preferably plugged into the jukebox 10 while the jukebox 10 boots. The first time the jukebox 10 is booted with a new hard drive, a Local Music Configuration Screen is displayed, which lists the available local music configurations that can be installed on the jukebox 10 or the listings of provisionings that are available for the jukebox 10. The user is prompted, on the user interface display 12, to select one of the available lists. This selection can be changed at any time by pressing a SERVICE button (not shown) on the controller 22 and then touching System Setup->Advanced Administration->Local Music Configuration, which are displayed on the user interface display 12.

In the preferred embodiment, the user interface display 12 may display a View button (not shown) on the touchscreen 52, which results in a signal being sent to the controller 22 and the controller sending a signal to the touchscreen 52 to display a box listing all of the albums of songs and/or videos in the selected list. Some albums may appear grayed out on the touchscreen 52, which means that some or all of the songs in the album are not currently stored in the controller 22, but such an indication is not so limiting and the listings may be otherwise configured to indicate that particular songs or videos are not stored in the controller 22. The jukebox 10 of the preferred embodiment will automatically download missing albums and songs if a list with grayed out album is selected. Alternatively, the controller 22 may scroll through a series or single prompt asking if the user wants the missing song or album downloaded to the controller 22, preferably from the central server 53. Specifically, an install button (not shown) may be displayed on the user interface display prompting the user to install the selected list. To install the selected list, the user touches the Install button at the bottom of the box on the touchscreen 52.

In the preferred embodiment, every time a new hard drive is installed in the controller 22, the touchscreen 52 is calibrated. A CALIBRATE button (not shown) on the controller 22 is depressed to launch a calibration program. The user interface display 12 is preferably then moved from the open configuration to the closed configuration and is locked. The user is preferably prompted to touch the center of the targets (not shown) that are displayed on the touchscreen 52 and then the user is prompted to touch different areas on the touchscreen 52. If a cursor follows the touches, a user preferably touches a YES button (not shown) on the touchscreen 52 to exit the calibration process. If the target touches are not recognized or the cursor does not follow the touches, the touchscreen 52 may also display a NO button (not shown) that may prompt additional calibration steps or a help button (not shown) may also be displayed that a user may touch to send a signal to the controller 22, which may in turn send a signal to the central server 53 to notify the manufacturer that there is a problem with the particular jukebox 10.

In the preferred embodiment of the jukebox 10, the bill acceptor 46 and the credit card reader 50 may also be checked or tested by pressing a SERVICE button (not shown) on the controller 22 to enter a service mode. A diagnostics button (not shown) may be displayed on the touchscreen 52 and, if depressed or touched, a credit device test button (not shown) may be displayed on the touchscreen 52, which, if touched, results in a test for the bill acceptor 46 and the bill input element 48. The jukebox 10 preferably prompts the user to insert bills into the bill acceptor 46 and visually check the touchscreen 52 to ensure appropriate credit is awarded, by visually observing whether the proper credit is displayed based on the bill input into the bill acceptor 46 through the bill input element 48. In addition, a user's credit card may be swiped through the credit reader 50 and a user checks that the user interface display 12 shows the last four digits of the credit card, a credit amount requested or another indication that the credit reader 50, controller 22 and jukebox 10 are functioning properly. The jukebox 10 may also be tested for acceptance of wireless electronic payments in a similar manner described above. When the checks are completed, the user may touch a back button (not shown) on the touchscreen 52 to return to a main menu (not shown).

To test a network of the preferred embodiment, including the central server 53 and the controller 22, a service mode is entered by pressing a service button (not shown) on the controller 22. The touchscreen 52 preferably displays a system setup button or icon (not shown) on the user interface display 12 and then an advanced administration button or icon (not shown) is displayed, which may be touched by the user. Touching the advanced administration button preferably results in a signal being sent to the controller 22 and the controller 22 sending a signal to the touchscreen 52 to display an advanced administration screen, which preferably includes a test connection button or icon (not shown). Touching the test connection button or icon sends a signal to the controller 22 and prompts the controller 22 to automatically send a signal to the central server 53 to connect to the central server 53 and to authenticate a connection between the controller 22 and the central server 53. If the connection is successful, the central server 53 sends a signal to the controller 22 and the controller 22 sends a signal to the touchscreen 52, which preferably displays a "Yes" icon next to a "Server Found" icon and a "Connected" icon. The touchscreen 52 is not limited to specifically displaying these series of icons and may otherwise make nearly any indication to the user that the connection is properly made, such as by showing a green light to indicate a successful connection and a red light to show an unsuccessful connection. If the connection fails in the preferred embodiment, the touchscreen 52 preferably displays a "No" icon. If the connection fails, the controller 22 preferably, automatically sends a signal to show a network information screen (Diagnostics->Network Information) on the touchscreen 52. This screen or graphic user interface ("GUI") preferably allows the user to check the internet protocol ("IP") configuration and run local area network ("LAN") and wide area network ("WAN") tests on the jukebox 10.

In the preferred embodiment, video selections are preferably enabled in the controller 22 of the jukebox 10 in order for music video selection options to appear on the user interface display 12. Once the preferred jukebox 10 is operational, the user may navigate to a playback management-video settings in service mode through the touchscreen 52. If a video settings menu option is not visible on the touchscreen 52, the user may check a video card of the controller 22 to be sure it is installed properly and fully seated in the mother board (not shown). The video card must be present and detected by the controller 22 before this option is made available. On the video settings screen, which is displayed on the touchscreen 52, the user may verify that an enable music videos checkbox is checked.

In the preferred jukebox 10, a video signal from one of a plurality of videos is played through a video card of the controller 22 to the video display 14 while the user interface display 12 is played through a low-voltage differential signal ("LVDS") interface on the mother board of the controller 22. Video will preferably play from any of three video ports (HDMI, DVI, or VGA) on the video card of the controller 22, but only one at a time. The video display 14 is preferably connected to the video card during boot-up of the jukebox 10 for the software of the controller 22 to detect the video display 14 and properly configure the correct port for the video display 14, but is not so limited and the controller 22 may automatically detect the video display 14 when it is connected to the controller 22 and if the video display 14 is changed after initial boot-up. If no video display 14 is plugged into the video card of the controller 22 on boot-up, a default video port output is preferably video graphics array ("VGA"). Videos are preferably played using High Definition 720p, but are not so limited, and may be played using nearly any resolution available and/or desired by the user. The controller 22 is also preferably adapted to change display types (HDMI, DVI, VGA) and the jukebox 10 is preferably rebooted with the new video display 14 connected to the video card of the controller 22 each time a new video display 14 is utilized, but is not so limited, as was describe above.

The preferred video display output port is HDMI, but is not so limited. If a user's location requires more than one display, use of an HDMI splitter is preferably utilized. The controller 22 is also preferably configured to adjust syncing of audio played from the speaker 24 with videos displayed on the video display 14 or the user interface display 12. While playing a music video, a user may adjust the delay until the audio and video are in sync. The touchscreen 52 may display a slider (not shown) which can be used for large timing changes and arrows may be displayed and touched for small incremental changes when syncing the audio and video. If the user touches either of the boxes showing the time delay in milliseconds (ms), a keypad is preferably automatically displayed on the user interface display 12 that allows the user to enter a specific number of time delays requested by the user.

The user or operator may also select pricing of video selections. The pricing of video selections is preferably set to one (1) more credit than audio selections, but is not so limited. If the audio selection cost is one (1) credit, the associated video preferably costs two (2) credits. If the audio cost is two (2) credits, the associated video preferably costs three (3) credits. The incremental price of a video can be configured on a Song Pricing screen (not shown) in the Service Mode with the minimum increment being one (1) credit. The jukebox 10 is not limited to this described pricing scheme and may be configured such that the user elects specific pricing or the controller 22 is pre-set with a pricing scheme that is not modifiable by the user or operator, but is pre-set into the controller 22. In addition, pricing may be directed centrally to a network of jukeboxes 10a, 10b, 10c, 10d by the central server 53.

The preferred video display 14 is preferably dedicated to the play of videos associated with the jukebox 10, but is not so limited. The video display 14 may be utilized to display video from third party providers, as desired by the user. For example, the video display 14 may be utilized to show local television or related content, such as advertising of the particular venue. When the video display 14 is being utilized for content other than displays directly related to the jukebox 10, such as playing videos related to songs of the jukebox 10, the controller 22 may be configured to disable videos or selection of videos from the user interface display 12. For example, when the video option is disabled for the jukebox 10, all of the videos shown on the touchscreen 52 may be X-ed out or shown in grayscreen, indicating that the videos are not available for play. The videos are preferably disabled in this situation such that patrons do not pay for video content which cannot be viewed, because the video display 14 is being used for alternative entertainment or advertising purposes.

In the preferred embodiment, the jukebox 10 is preferably able to display a "Top Video" tab or icon on the touchscreen 52. The Top Video tab is preferably displayed at a top left edge of the touchscreen 52. When a user touches the Top Video tab, a signal is preferably sent to the controller 22 and the controller 22 sends a signal to the touchscreen 52 to launch a page showing a top forty (40) video selections. The top forty (40) video selections may be the top forty (40) local selections made from the individual jukebox 10, the top videos selected from a plurality of jukeboxes 10a, 10b, 10c, 10d at a venue, the top videos selected from a regional network of jukeboxes 10 or the top videos selected from nearly any region desired by the user or operator. The jukebox 10 of the preferred embodiment is not limited to including this feature, but the Top Video tab is preferred to increase the enjoyment of the device for patrons and users.

In the preferred embodiment, songs that have an associated video are displayed on the touchscreen 52 with a small "TV Monitor" icon in a song selection tab. The jukebox 10 is not so limited and songs with videos may otherwise be displayed to indicate to the user that particular songs include associated videos. The touchscreen 52 may also display an artist page on the user interface display 12 that shows songs associated with a particular artist. In this configuration, the user interface display 12 preferably includes a tab to display only video selections for that artist. However, if the artist has no videos available an All Videos tab will preferably appear on the touchscreen 52.

In the preferred jukebox 10, videos are preferably associated with one or more audio selections. When a customer or user selects a song to play and there is an associated video available, the customer is preferably automatically presented a choice to play the song, which plays just the audio from the song or a selection to play a music video, which preferably plays both the audio and the video. The selection icons are preferably automatically displayed on the touchscreen 52 for election by the user. In the preferred embodiment, selecting the video option will cost additional credits for the user and additional credits may automatically be requested from the user if there are not enough credits to facilitate play of the audio and/or video.

The controller 22 may be configured such that selecting a video from the Top Video tab or the All Videos tab will present only the video selection. The audio only option is preferably not presented in this case, but is not so limited and the user may be presented with an option to play only the audio, even when selecting from the Top Video or All Video tabs.

It will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention as defined by the present disclosure.

We claim:

1. A jukebox for playing music and presenting video to a user, the jukebox comprising:
   a housing including an upper portion and a lower portion;
   a user interface display mounted to the lower portion, the user interface display including a touchscreen;
   a controller mounted to the housing and being in communication with the user interface display, the controller being mounted in a cavity defined by the housing;
   a display mounting assembly secured to the upper portion; and
   a video display mountable to the upper portion of the housing by the display mounting assembly, the video display in communication with the controller, the user interface display, the controller and the video display configured to facilitate the user's selection of a song from a plurality of songs stored in the controller and to selectively display a video associated with the selected song on the video display, the display mounting assembly adjustable to accommodate the video display, the video display having different sizes and the display mounting assembly configured to mount the video display to the housing by securing the video display at various heights relative to the housing.

2. The jukebox of claim 1, further comprising:
   an amplifier assembly and a power distribution assembly mounted in the cavity.

3. The jukebox of claim 1, further comprising:
   a graphic panel movably mounted to the housing, the different sizes of the video display include a first video display having a first height, a second video display having a second height and a third video display having a third height, the graphic panel movable relative to the housing to accommodate the first, second and third heights of the first, second and third video displays, respectively.

4. The jukebox of claim 3, wherein the first video display is secured at a first location on the display mounting assembly, the second video display is secured at a second location on the display mounting assembly and the third video display is secured at a third location on the display mounting assembly.

5. The jukebox of claim 3, wherein the display mounting assembly is mounted at a first position relative to the housing when the first video display is mounted to the display mounting assembly, the display mounting assembly is mounted at a second position relative to the housing when the second video display is mounted to the display mounting assembly and the display mounting assembly is mounted at a third position relative to the housing when the third video display is mounted to the display mounting assembly.

6. The jukebox of claim 1, further comprising:
   a mouth defined by the cavity;
   a first locking mechanism mounted to the user interface display; and
   a second locking mechanism mounted to the housing within the cavity, the user interface display being pivotably mounted to the housing and being pivotable from a closed configuration, wherein the user interface is positioned over the mouth to an open configuration, wherein the user interface is spaced from the mouth, thereby providing access to the cavity, the first locking mechanism engaged with the second locking mechanism in the closed configuration and the first locking mechanism spaced from the second locking mechanism in the open configuration.

7. The jukebox of claim 4, wherein the first locking mechanism includes a latch tab and the second locking mechanism includes a pivotable latch assembly.

8. The jukebox of claim 1, wherein the controller includes a hard drive.

9. The jukebox of claim 1, wherein the user interface display is comprised of a touchscreen display.

10. The jukebox of claim 1, wherein the video display comprises a first video display and a second video display, the first and second video displays mounted to the housing in a mounted configuration, the first video display mounted proximate an upper portion of the housing and the second video display mounted proximate a lower portion of the housing.

11. The jukebox of claim 1, wherein the video display comprises a first video display and a second video display, the first and second video displays mounted to the housing in a mounted configuration, the first and second video displays mounted to an upper portion of the housing at substantially the same height relative to the user interface display.

12. The jukebox of claim 1, further comprising:
a speaker in communication with the controller.

13. A jukebox for playing music and presenting video to a user, the jukebox comprising:
a housing including an upper portion and a lower portion;
a user interface display mounted to the lower portion, the user interface display including a touchscreen;
a controller mounted to the housing and being in communication with the user interface display, the controller being mounted in a cavity defined by the housing;
a display mounting assembly secured to the upper portion;
a graphic panel movably mounted to the upper portion; and
a video display mountable to the upper portion of the housing by the display mounting assembly, the video display in communication with the controller, the user interface display, the controller and the video display configured to facilitate the user's selection of a song from a plurality of songs stored in the controller and to selectively display a video associated with the selected song on the video display, the graphic panel adjustable to accommodate the video display, the graphic panel movable along a substantially vertical housing axis.

14. The jukebox of claim 13, wherein the graphic panel includes a panel mounting rail with an elongated substantially vertical slot.

15. The jukebox of claim 14, wherein the upper housing includes a housing rail, the panel mounting rail being aligned with the mounting rail such that fasteners engage the vertical slot and the panel mounting rail to secure the graphic panel to the housing.

16. The jukebox of claim 14, further comprising:
a camera assembly mounted to the housing, the camera assembly being in communication with the controller, the jukebox configured to take photographs and videos proximate a front of the housing as the plurality of songs are played on the jukebox for display on the video display.

17. A jukebox for playing music and presenting video to a user, the jukebox comprising:
a housing including an upper portion and a lower portion, the lower portion including a cavity having a mouth and a second locking mechanism mounted within the cavity;
a user interface display mounted to the lower portion such that the user interface display covers the mouth in a closed configuration, the user interface display including a first lock mechanism on a rear surface facing the cavity, the first lock mechanism engageable with the second lock mechanism to lock the user interface display in the closed configuration and an upper edge of the user interface display being pivotable away from the lower portion to an open configuration, the user interface display slidable relative to the lower portion substantially parallel to the mouth;
a controller mounted to the housing and being in communication with the user interface display, the controller being mounted in the cavity; and
a video display mounted to the upper portion, the video display in communication with the controller, the user interface display, the controller and the video display configured to facilitate the user's selection of a song from a plurality of songs stored in the controller and to selectively display a video associated with the selected song on the video display.

18. The jukebox of claim 17, wherein the user interface display includes a touchscreen.

19. The jukebox of claim 17, wherein the first lock mechanism includes two hook elements mounted proximate the upper edge.

20. The jukebox of claim 17, wherein the second lock mechanism includes first and second latch plates, the first latch plate including a first latch release tab and a first lock pin and the second latch plate including a second latch release tab and a second lock pin.

\* \* \* \* \*